(No Model.)
3 Sheets—Sheet 1.
F. DORSEY.
PROCESS OF PACKING AND PRESERVING CORNMEAL, &c.
No. 343,163. Patented June 8, 1886.
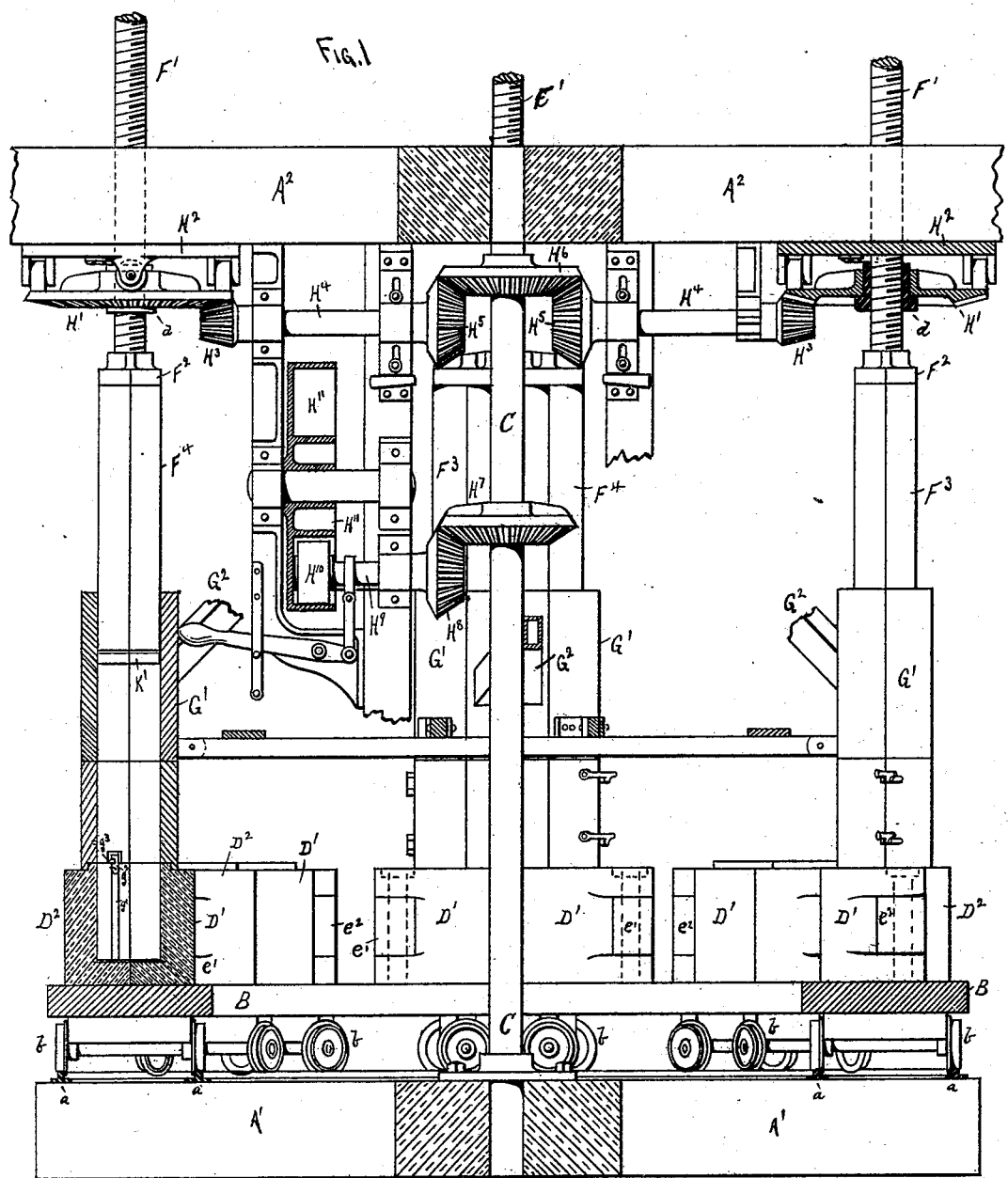
WITNESSES.
M. E. Keough.
H. S. Webster.
Frederick Dorsey,
INVENTOR, BY
Charles K. Woodward
Atty.

(No Model.) 3 Sheets—Sheet 2.
F. DORSEY.
PROCESS OF PACKING AND PRESERVING CORNMEAL, &c.
No. 343,163. Patented June 8, 1886.
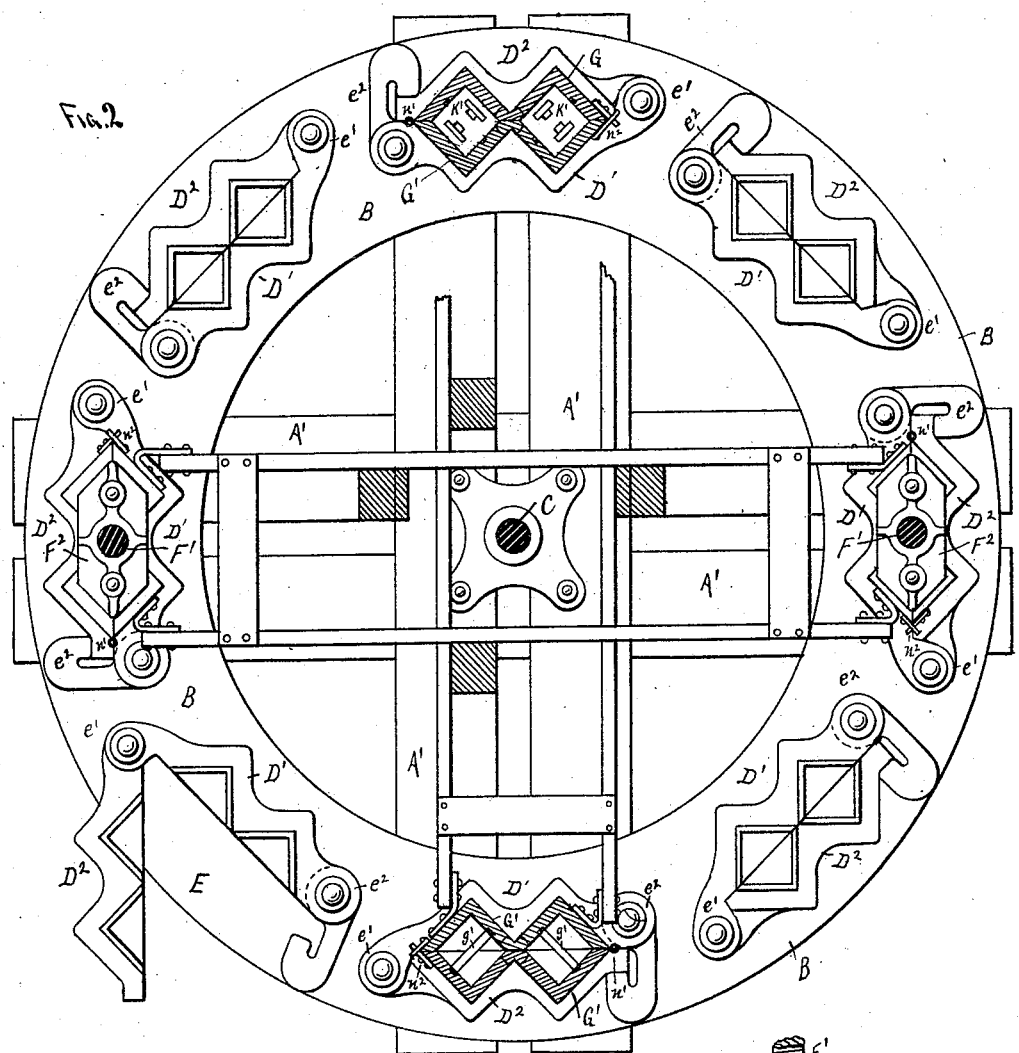
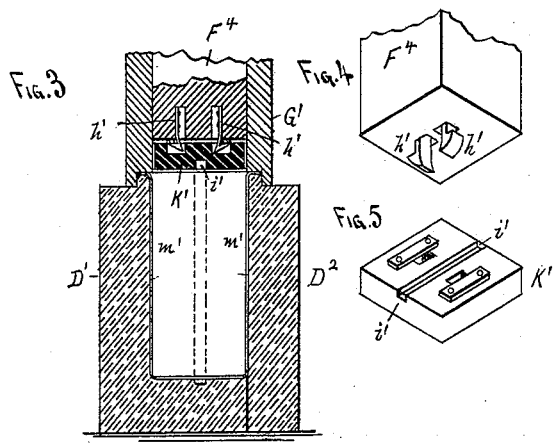
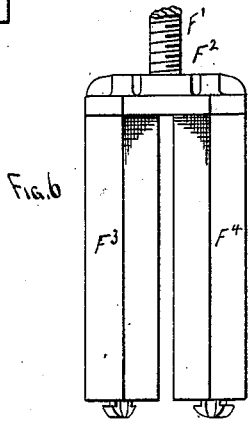
WITNESSES.
M. E. Keough.
H. S. Webster.
Frederick Dorsey,
INVENTOR BY
Charles N. Woodward,
Atty.

(No Model.) 3 Sheets—Sheet 3.
F. DORSEY.
PROCESS OF PACKING AND PRESERVING CORNMEAL, &c.
No. 343,163. Patented June 8, 1886.
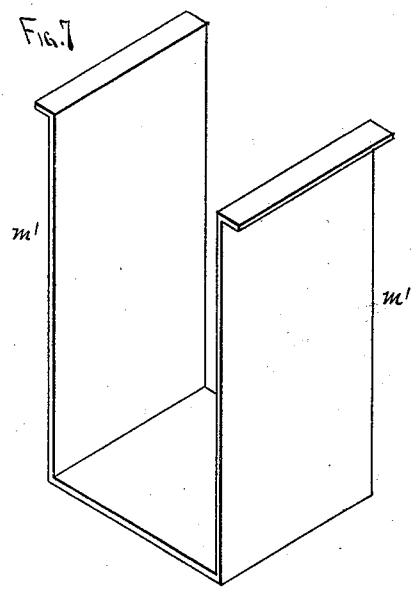
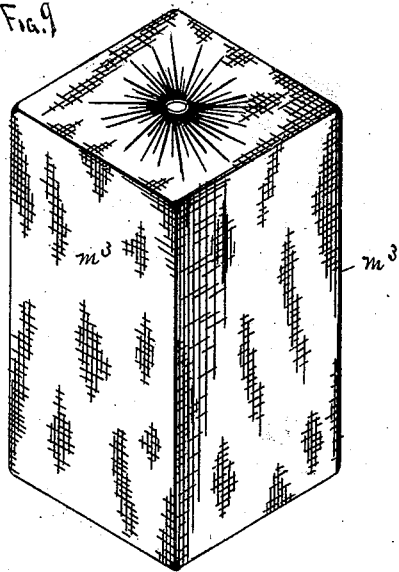
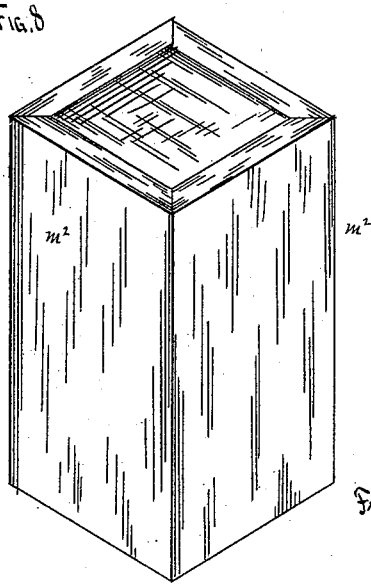
WITNESSES.
M. E. Keough.
N. S. Webster.
Frederick Dorsey,
INVENTOR. BY
Charles N. Woodward
Atty.

UNITED STATES PATENT OFFICE.

FREDERICK DORSEY, OF HAGERSTOWN, MARYLAND.

PROCESS OF PACKING AND PRESERVING CORNMEAL, &c.

SPECIFICATION forming part of Letters Patent No. 343,163, dated June 8, 1886.

Application filed October 17, 1885. Serial No. 180,209. (No model.)

*To all whom it may concern:*

Be it known that I, FREDERICK DORSEY, a citizen of the United States, and a resident of Hagerstown, in the county of Washington and State of Maryland, have invented certain new and useful Improvements in a Process for Packing and Preserving Cornmeal, Flour, &c., of which the following is a specification.

This invention consists in subjecting cornmeal, flour, and similar substances to a pressure sufficient to force the starchy and oily matter contained therein to the surface of the mass, where it hardens into a moisture and air impervious envelope, preserving the bulk of the meal or flour from the action of the atmosphere, so that it may be kept for a long time in warm or moist climates, and on shipboard, without any further attention.

To cause the starch or oil, or the two combined, to be thus forced to the surface of the mass, requires a very heavy pressure—from two thousand to five thousand pounds to the square inch—which can best be produced by the use of especially-designed machinery, as shown in the drawings. This extreme pressure in no degree affects the mass of the meal or flour deleteriously, and it is found as sound and free from decay or deterioration after months of exposure to damp and heat or cold as when first ground. It may be pressed into packages of any desired size, but will generally be formed into small parcels for convenience in handling. An envelope of paper coated with paraffine or some other similar suitable substance will generally be used to incase the compressed packages to protect them from insects and vermin. The compressed packages may also be incased in sacks of some suitable fabric as a further protection, these fabric sacks being used in addition to or in place of the paraffine-coated paper, as preferred or circumstances may require. If the meal is to be stored at the place where it is compressed, it will only require the paraffine-coated envelope; but if it is to be shipped to a distance, or handled frequently, then the fabric envelope should be used, and, generally, both the fabric and paper envelope will be used.

Many suitable forms of machinery may be used to compress the meal; but for the purpose of illustration I have shown in the drawings an approved system of presses which I shall generally use for this purpose.

Figure 1 represents a semi-sectional side elevation of a system of presses suitable for compressing the packages; Fig. 2, a plan view, partially in section, of the presses, as shown in Fig. 1. Fig. 3 is an enlarged sectional detail of one of the casings and follower-plates, illustrating the manner of compressing the meal into the receiver. Fig. 4 is an enlarged perspective view of the lower end of one of the plungers or pistons of one of the presses; and Fig. 5 is a perspective view of one of the follower-plates removed, Fig. 4 showing the lower surface of the plunger, and Fig. 5 showing the upper surface of the follower-plate, the two views together illustrating the manner of coupling the follower-plate and plunger together. Fig. 6 is a detached side view of a pair of the plungers. Fig. 7 is a perspective view of the sheet-iron frame which will be used to support the compressed mass while the paper envelope is being attached thereto. Fig. 8 is a perspective view of one of the compressed packages covered with paper. Fig. 9 is a perspective view of one of the compressed packages covered with a fabric or sack.

A' represents a base-frame, on which a circular track, $a$, is arranged, and on this track is mounted, by flanged wheels $b$, a circular turn-table or platform, B, the platform being a turn-table adapted to revolve on the track $a$ about a central upright shaft, C, the latter stepped by its lower end in the center of the frame A', and supported at its upper end in an upper frame, A². Upon this turn-table B, at equal distances apart, are secured a series of meal-receptacles, each consisting of two parts, D' D², hinged together by one end at $e'$, and clamped by hooks or other means, $e^2$, at the other end, so that the two parts can be closed and locked together, or opened out, as shown at E in Fig. 2. Each half of each of these receptacles is formed with two angular cavities, (see E, Fig. 2,) so that when brought together and clamped two square cavities will be formed in each receptacle, and then when the receptacles are opened, as at E in Fig. 2, the cavities being divided across the centers diagonally, the contents can be easily removed, as hereinafter shown. These receptacles will be made of metal, and very strong and heavy, to resist the great pressure to which they must be subjected. The inner half, D', of each of these receptacles will be fixed to the turn-table B, and the outer halves, D², only adapted to be opened outward. Any number of these receptacles may be employed; but generally eight will be arranged upon each turn-table, as shown, four sets of the receptacles being used at a time, while the remaining four are being emptied and prepared for another supply, as hereinafter shown.

Above every other one of the receptacles is arranged a large screw, F', each screw being swiveled in the center of a plate, F², and each plate F² being supplied with two square plungers, F³ F⁴, adapted to fit down into square casings G', which rest upon top of and form continuations to the receptacles D' D², the interior of the casings G' and the receptacles D' D² corresponding in size and shape. The casings G' are somewhat longer than the receptacles D' D², and will each be supplied with a feed-spout, G², near their upper ends, through which the meal will flow from any convenient point above.

The screws F' pass upward through nuts $d$ in the hubs of bevel-gears H', the latter adapted to run against anti-friction pulleys on plates H² on the under side of the frame A², and arranged to be driven by bevel-pinions H³ on horizontal shafts H⁴, converging toward the central shaft, C, to which they are connected by bevel-pinions H⁵ and a bevel-gear, H⁶. By this means the revolution of the shaft C will be communicated to the screws F', and the latter will be run upward or downward, according as the shaft C is revolved to the right or left. The shaft C is provided with a bevel-gear, H⁷, adapted to be driven by a bevel-pinion, H⁸, on a shaft, H⁹, the latter having a friction-pulley, H¹⁰, arranged to be thrown into gear alternately with a double faced constantly-revolving drum, H¹¹, as shown, so that the motion of the shaft C may be reversed by merely moving the friction-pulley upward and downward.

The arrangement of the turn-table and the screws and the manner of driving the screws are the same as those shown in my Patent No. 320,052, dated June 16, 1885.

Within each of the receptacles D' D² a sheet-iron frame, $g'$, will first be inserted, the upper ends of this frame being provided with hinged sections $g^2$, extended above the upper edges of the receptacles and provided with notches $g^3$ in the hinged sections. A follower-plate, K', is adapted to be connected temporarily to the lower end of each of the plungers F³ F⁴ by barbed spring-catches $h'$ in the plungers engaging with plates $h^2$ on the follower-plates, so that the follower-plates will rise with the plungers and screws, as shown in Fig. 1. The follower-plates K' will each be provided with a channel, $i'$, (see Fig. 5,) across their upper surfaces, which will come in line with the notches $g^3$, so that when the plungers are forced downward a clamp-bar may be passed through the notches and the channel $i'$, and thus connect the follower-plate to the compressed package, as in my patent above referred to. Then by compressing the barbed catches $h'$ until they are disengaged from the plates $h^2$ the plungers may be run upward, leaving the follower-plate attached to the compressed package, which may then be removed from the receptacle by opening the section D', as at E in Fig. 2. The package will then be placed in a sheet-iron box or frame, $m'$, containing a paper envelope, $m^2$, coated with paraffine or some other similar suitable insect or vermin proof substance, and the paper then pasted along its edges. The packages thus protected will then be inserted into a sack, $m^3$, of any suitable fabric, and the latter sewed or laced together around it, as shown in Fig. 9.

The pressure necessary to force the starch or oil to the surface of the mass of the meal will be so great that the particles will adhere so tenaciously together as to require little or no vehicle to support them, a mere strap, $g'$ being sufficient to enable them to be lifted bodily from the receptacles and placed in the paper and fabric envelopes.

The lower parts of the casings G' will be formed in two parts and hinged and clamped together at $n'$ $n^2$, so that they can be opened out to enable the operator to have access to the interior to insert the clamping-bar through the notches $g^3$, and also to connect and disconnect the follower-plates K' to and from the plungers.

I do not herein make any claim to the apparatus shown and described for compressing meal, &c.; but I reserve the right to make a separate application for Letters Patent covering the same; also, I do not herein claim the packages of meal produced by this process and inclosed with a covering of paper as constituting an improved article of manufacture; but I also reserve the right to make a separate application for Letters Patent to cover such article of manufacture.

Having thus described my invention, what I herein claim as new is—

1. The process of preserving cornmeal, flour, or similar substance by subjecting it to a pressure sufficient to force the starch or oil or starch and oil contained therein to the surface of the mass to form thereon a moisture and air impervious envelope.

2. A package or mass of cornmeal, flour, or other similar substance which has been subjected to a pressure sufficient to force the starch or oil or starch and oil contained therein to the surface of the mass to form a moisture and air impervious envelope thereon.

In testimony whereof I have hereunto set my hand in the presence of two subscribing witnesses.

FREDERICK DORSEY.

Witnesses:
ALDEN H. POTTER,
C. N. WOODWARD.